United States Patent Office 2,991,104
Patented July 4, 1961

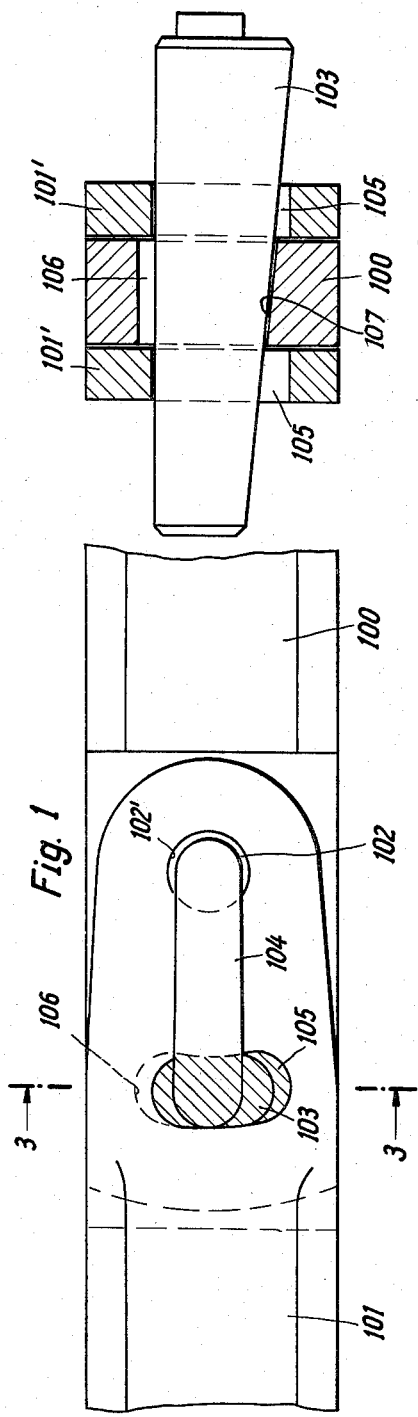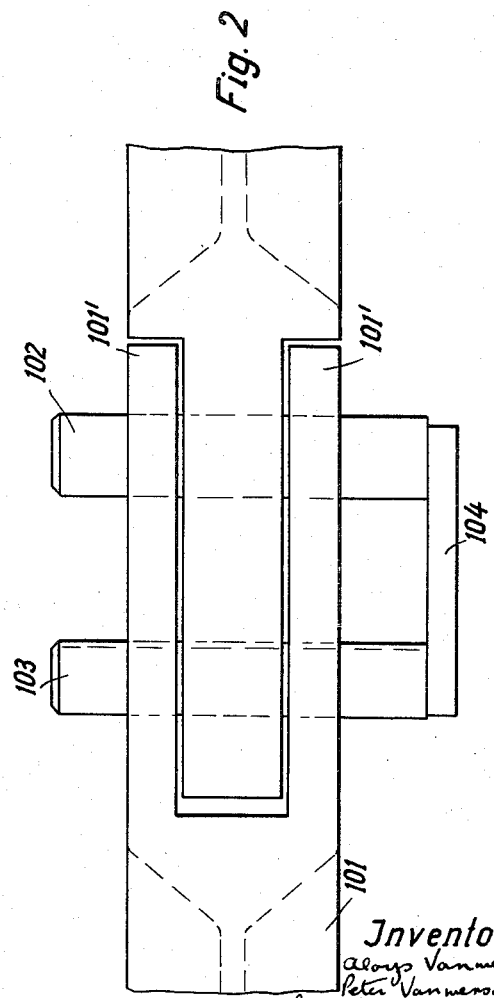

2,991,104
CONNECTING STRUCTURE FOR BEAMS OF A ROOF SUPPORT OR THE LIKE
Aloys Vanwersch, Angermund, Bezirk Dusseldorf, Peter Vanwersch, Aachen, and Ludwig Vanwersch, Eschweiler, near Aachen, Germany, assignors to Firma Eisenwerk Wanheim G.m.b.H., Duisburg-Wanheim, Germany
Original application May 23, 1955, Ser. No. 510,204. Divided and this application Dec. 24, 1958, Ser. No. 782,858
In France July 8, 1948
Public Law 619, Aug. 23, 1954
Patent expires July 8, 1968
3 Claims. (Cl. 287—99)

This application is a divisional application of our co-pending application Serial No. 510,204, dated May 23, 1955.

The present invention relates to supporting structures particularly of the type used to support the roof of a mine shaft or the like.

Particular problems are involved in supports of the above type because, on the one hand, they must be robust enough to withstand great forces and because, on the other hand, they must be flexible enough to conform to whatever shape the roof of the mine shaft or the like happens to take.

One of the objects of the present invention is to solve the above problems by providing connections between a plurality of beams which lend to the connected beams sufficient flexibility to conform to a given roof shape and which also lock the means together in such a way that they provide an extremely strong support.

Another object of the present invention is to provide a beam connecting structure of the above type which is exceedingly simple and which prevents angular displacement of a pair of beams with respect to each other in either direction.

Furthermore, it is an object of the present invention to provide a beam arrangement of the above type which may be disassembled whenever desired to have the beams reversed, for example.

Also, it is an object of the present invention to provide a beam adjusting structure which in addition to adjusting the angle between a pair of successive beams serves also to lock the beams in their adjusted position.

With the above objects in view, the present invention mainly consists of a supporting structure which includes a first beam having a bifurcated end portion provided with a pair of spaced walls each of which is formed with openings, the openings of one wall being aligned with those of the other wall. A second beam has an end portion extending between the spaced walls of the first beam and formed with openings aligned with those of the spaced walls. A pivot pin extends through one set of aligned openings so that the first and second beams are turnable with respect to each other to a desired angular position, and one or more elongated wedge members extend through the other set of aligned openings for locking the beams in a given angular position as well as for turning the beams to the desired angular position.

According to an additional feature of the invention, the pivot pin and the elongated wedge member are connected by a strap.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing, in which:

FIG. 1 is a fragmentary side elevational view illustrating one possible manner of interconnecting a pair of beams;

FIG. 2 is a fragmentary top view of the structure shown in FIG. 1; and

FIG. 3 is a cross-sectional view taken along line 3—3 of FIG. 1 and viewed in the dimension of the arrows.

Referring now to the drawing, it will be seen that the beam 101 has a bifurcated end portion provided with a pair of spaced walls 101', 101' between which the end portion of the beam 100 freely extends. The beams 100 and 101 are supported in a known way be suitable props not shown in the drawing and serving to hold the beams against the roof of a mine shaft or the like. The walls 101' of the end portion of beam 101 and the end portion of beam 100 are respectively formed with openings 102' which are aligned and through which a pivot pin 102 extends so that in this way the beams 100 and 101 are pivotally connected for angular movement with respect to each other. Through such angular movement of the beams it is possible to arrange them so that they correspond to the contour of a particular roof to be supported. The walls 101' of the bifurcated end portion of beam 101 are furthermore formed with a pair of aligned openings 105 respectively, through which and the opening 106 in the end portion of the beam 100 an elongated wedge member 103 extends. The opening 106 defines at the bottom thereof an abutment face 107 against which the wedge member 103 abuts and it will be evident that the angular position of the beams 100 and 101 with respect to each other will depend on the extent the wedge member 103 is driven into the openings 105.

A strap 104 is fastened to members 102 and 103 so that these members are interconnected by the strap 104 and the wedge member cannot become separated from the pivot pin 102.

Strap 104 may be a separate element fastened to members 102 and 103 either permanently or releasably by any known means. Preferably, members 102, 103 and strap 104 are integral and form a unitary structure.

It will be understood that each of the elements described above, or two or more together, may also find a useful application in other types of supporting structures differing from the types described above.

While the invention has been illustrated and described as embodied in pivotally interconnected beams of a supporting structure, it is not intended to be limited to the details shown, since various modifications and structural changes may be made without departing in any way from the spirit of the present invention.

Without further anaylsis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a supporting structure, in combination, a first beam having a bifurcated end portion provided with a pair of spaced walls each of which is formed with a pivot opening, said opening in one of said walls being aligned with that in said other wall; a second beam having an end portion freely extending between said spaced walls and formed with a pivot opening aligned with said pivot openings in said walls; a pivot pin extending through said openings for connecting said beams for pivotal movement to a desired angular position with respect to each other; the end portion of one of said first and second beams being formed with an additional opening spaced from said pivot opening in said end portion, the end portion of the other one of said first and second beams being formed with an abutment face located for alignment with said additional opening; a wedge member extending through said additional opening and abutting against said abutment face for locking the beams in a desired angular position which will depend on the extent said wedge member is driven into said additional opening; and strap means fixed to and interconnecting said pivot pin and said wedge member.

2. In a supporting structure, in combination, a first beam having a bifurcated end portion provided with a pair of spaced walls each of which is formed with a pivot opening, said opening in one of said walls being aligned with that in said other wall; a second beam having an end portion freely extending between said spaced walls and formed with a pivot opening aligned with said pivot openings in said walls; a pivot pin extending through said openings for connecting said beams for pivotal movement to a desired angular position with respect to each other; the end portion of one of said first and second beams being formed with an additional opening spaced from said pivot opening in said end portion, the end portion of the other one of said first and second beams being formed with an abutment face located for alignment with said additional opening; a wedge member extending through said additional opening and abutting against said abutment face for locking the beams in a desired angular position which will depend on the extent said wedge member is driven into said additional opening; and strap means integrally fixed to and interconnecting said pivot pin and said wedge member.

3. In a supporting structure, in combination, a first beam having a bifurcated end portion provided with a pair of spaced walls each of which is formed with a pair of openings distributed longitudinally along said beam with the openings of one wall aligned with those of the other wall; a second beam having an end portion extending between said spaced walls and formed with a pair of openings aligned with those of said walls to provide two sets of three aligned openings each; a pivot pin extending through one set of aligned openings for connecting said beams for pivotal movement to a desired angular position with respect to each other; a wedge member extending through the other set of aligned openings for locking the beams in a desired angular position which will depend on the extent said wedge member is driven into the other set of aligned openings; and a strap fixed to and interconnecting said pivot pin and wedge member.

References Cited in the file of this patent

FOREIGN PATENTS

| | | |
|---|---|---|
| 73,200 | Netherlands | Sept. 15, 1953 |
| 1,009,905 | France | Mar. 12, 1952 |
| 1,135,845 | France | Dec. 22, 1956 |